(12) United States Patent  
Al-Fahmi et al.

(10) Patent No.: US 12,540,884 B2  
(45) Date of Patent: Feb. 3, 2026

(54) DETERMINING FRACTURE ROUGHNESS FROM A CORE

(71) Applicants: Saudi Arabian Oil Company, Dhahran (SA); The Chancellor, Masters, and Scholars of the University of Oxford, Oxford (GB)

(72) Inventors: Mohammed M. Al-Fahmi, Al Khobar (SA); Sait Ismail Ozkaya, Ankara (AR)

(73) Assignees: The Chancellor, Masters, and Scholars of the University of Oxford, Oxford (GB); Saudi Arabian Oil Company, Dhahran (SA)

(*) Notice: Subject to any disclaimer, the term of this patent is extended or adjusted under 35 U.S.C. 154(b) by 341 days.

(21) Appl. No.: 18/448,676

(22) Filed: Aug. 11, 2023

(65) Prior Publication Data

US 2025/0052644 A1  Feb. 13, 2025

(51) Int. Cl.
| | |
|---|---|
| *G01N 1/08* | (2006.01) |
| *E21B 10/02* | (2006.01) |
| *E21B 49/00* | (2006.01) |
| *G01B 11/30* | (2006.01) |
| *G01N 33/24* | (2006.01) |
| *G06T 7/60* | (2017.01) |

(52) U.S. Cl.
CPC .............. *G01N 1/08* (2013.01); *E21B 10/02* (2013.01); *E21B 49/00* (2013.01); *G01B 11/30* (2013.01); *G01N 33/24* (2013.01); *G06T 7/60* (2013.01); *G01V 2210/646* (2013.01)

(58) Field of Classification Search
CPC .... G01V 2210/646; G01B 11/30; G01N 1/08; E21B 10/02; E21B 49/00
See application file for complete search history.

(56) References Cited

U.S. PATENT DOCUMENTS

2021/0217192 A1* 7/2021 LeFranc .............. G06V 10/764

OTHER PUBLICATIONS

Scalco et al., "Determination of roughness coefficient in 3D digital representations of rocks", Sci Rep. Jun. 2, 20225, PMID: 35752655; PMCID: PMC9233708 (Year: 2022).*
Al-Fahmi et al., "FracRough-Computer program to calculate fracture roughness from reservoir rock core," Applied Computing and Geosciences, Mar. 2021, 9(100045):10 pages.
Barton "Review of a new shear-strength criterion for rock joints," Eng. Geol., Nov. 1973, 7:287-332, 46 pages.
Jang et al., "Determination of Joint Roughness Coefficients Using Roughness Parameters," Rock Mech. Rock Eng., Jan. 2014, 47:2061-2073, 13 pages.

* cited by examiner

*Primary Examiner* — Peter K Huntsinger
(74) *Attorney, Agent, or Firm* — Fish & Richardson P.C.

(57) ABSTRACT

A computer-implemented method for determining fracture roughness from a core is described. In examples, a drill core is scanned to obtain core images, and natural fractures in the core images are identified using sequential filtering. The identified natural fractures in the core images are digitized and used to obtain a fracture profile comprising a pair of sinusoids corresponding to the top wall and the base wall of the identified natural fractures. A best fitting sinusoid of the fracture profile is determined and used to calculate at least one statistical estimator. The calculated statistical estimator is used to calculate a joint roughness coefficient.

20 Claims, 11 Drawing Sheets

DETERMINING FRACTURE ROUGHNESS FROM A CORE

TECHNICAL FIELD

This disclosure relates generally to determining fracture roughness.

BACKGROUND

Core samples are acquired from oil and gas wells using drill bits that cut rocks in a cylindrical shape. The core samples provide information about the corresponding rock formation. The core samples are analyzed to determine the rock composition, stratigraphy, sedimentary structures, structural features, and physical properties of the corresponding rock formation.

SUMMARY

An embodiment described herein provides a method for determining fracture roughness. The method includes scanning, using at least one hardware processor, a drill core to obtain core images. The method includes identifying, using the at least one hardware processor, natural fractures in the core images, wherein the identification of natural fractures is done using sequential filtering. Sequential filtering includes: excluding from further processing core images that show fractures formed by damage to the drill core; excluding from further processing core images that show bed splitting; excluding from further processing core images that show disking; excluding from further processing core images that show vertical fractures with planes parallel to a direction of maximum horizontal stress when the core is obtained from a vertical borehole; and excluding from further processing veins and other fractures of partial intersections. The method includes digitizing, using the at least one hardware processor, the identified natural fractures in the core images to obtain a pair of ellipses corresponding to a top wall and a base wall of the identified natural fractures. The method includes unrolling, using the at least one hardware processor, the pair of ellipses into a fracture profile comprising a pair of sinusoids corresponding to the top wall and the base wall of the identified natural fractures. The method includes determining, using the at least one hardware processor, a best fitting sinusoid of the fracture profile, wherein at least one statistical estimator is calculated using a difference between the best fitting sinusoid and the fracture profile. The method includes converting, using the at least one hardware processor, the calculated statistical estimators to a joint roughness coefficient.

An embodiment described herein provides an apparatus comprising a non-transitory, computer readable, storage medium that stores instructions that, when executed by at least one processor, cause the at least one processor to perform operations. The operations include scanning a drill core to obtain core images. The operations include identifying natural fractures in the core images, wherein the identification of natural fractures is done using sequential filtering. Sequential filtering includes: excluding from further processing core images that show fractures formed by damage to the drill core; excluding from further processing core images that show bed splitting; excluding from further processing core images that show disking; excluding from further processing core images that show vertical fractures with planes parallel to a direction of maximum horizontal stress when the core is obtained from a vertical borehole; and excluding from further processing veins and other fractures of partial intersections. The operations include digitizing the identified natural fractures in the core images to obtain a pair of ellipses corresponding to a top wall and a base wall of the identified natural fractures. The operations include unrolling the pair of ellipses into a fracture profile comprising a pair of sinusoids corresponding to the top wall and the base wall of the identified natural fractures. The operations include determining a best fitting sinusoid of the fracture profile, wherein at least one statistical estimator is calculated using a difference between the best fitting sinusoid and the fracture profile. The operations include converting the calculated statistical estimators to a joint roughness coefficient.

An embodiment described herein provides a system. The system comprises one or more memory modules and one or more hardware processors communicably coupled to the one or more memory modules. The one or more hardware processors is configured to execute instructions stored on the one or more memory models to perform operations. The operations include scanning a drill core to obtain core images. The operations include identifying natural fractures in the core images, wherein the identification of natural fractures is done using sequential filtering. Sequential filtering includes: excluding from further processing core images that show fractures formed by damage to the drill core; excluding from further processing core images that show bed splitting; excluding from further processing core images that show disking; excluding from further processing core images that show vertical fractures with planes parallel to a direction of maximum horizontal stress when the core is obtained from a vertical borehole; and excluding from further processing veins and other fractures of partial intersections. The operations include digitizing the identified natural fractures in the core images to obtain a pair of ellipses corresponding to a top wall and a base wall of the identified natural fractures. The operations include unrolling the pair of ellipses into a fracture profile comprising a pair of sinusoids corresponding to the top wall and the base wall of the identified natural fractures. The operations include determining a best fitting sinusoid of the fracture profile, wherein at least one statistical estimator is calculated using a difference between the best fitting sinusoid and the fracture profile. The operations include converting the calculated statistical estimators to a joint roughness coefficient.

In some embodiments, excluding from further processing core images that show bed splitting is performed using a predetermined threshold to filter core splits along bed planes.

In some embodiments, drill cores are excluded from scanning that do not satisfy a predetermined geometry.

In some embodiments, damaged drill cores are excluded from scanning.

In some embodiments, digitizing the identified natural fractures in the core images to obtain a pair of ellipses comprises tracing the identified natural fractures.

In some embodiments, the best fitting position of the sinusoid minimizes the joint roughness coefficient.

In some embodiments, calculating mismatches of the top wall and the base wall of a respective natural fracture uses a correlation coefficient or a standard deviation of apertures between the top wall and the base wall.

DETAILED DESCRIPTION

Cores acquired from oil and gas wells can provide information on the rock formation. Cores are typically obtained from drilling boreholes using drill bits that cut subsurface rocks in a cylindrical shape. Cores often intersect fractures, and a roughness of the fracture is used to assess the stability and permeability of the corresponding rock formation. The fracture roughness is used to guide drilling operations at the rock formation. The degree of fracture roughness is quantified by the joint roughness coefficient (JRC). The present techniques enable automatic calculation of the JRC from core images. In some embodiments, the present techniques enable the calculation of wall mismatches of reservoir fractures after digitizing the traces of fractures from the core exterior photographs.

Figure 1:
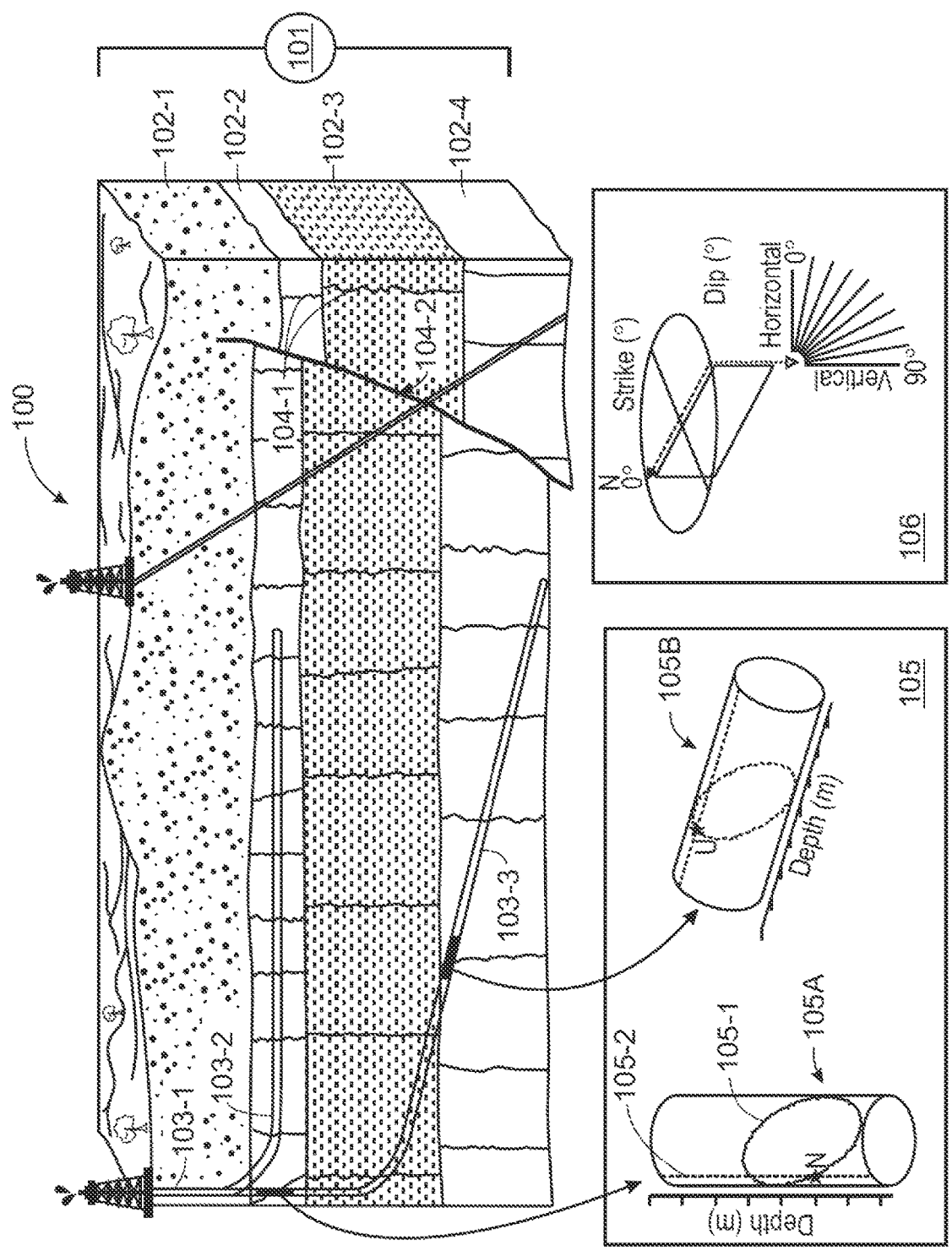
FIG. 1 is a schematic view showing a cross section of a subterranean region.

FIG. 1 is a schematic view 100 showing a cross section of a subterranean region 101 that includes four sedimentary strata (102-1 through 102-4). In particular. FIG. 1 is a cross section of a subterranean region 101 of four sedimentary strata showing boreholes of different geometry, from which cores are obtained. Depth scale, dip and azimuth of geological features in the core, whether vertical or horizontal, can be constructed using borehole surveys. As shown in FIG. 1, the subterranean region 101 has a sand layer 102-1, a sandstone layer 102-2, a shale layer 102-3, and a limestone layer 106-4. As shown, the subterranean region 101 also includes fractures 104-1 that cut the layers 102-1 through 102-4 from top to bottom, and a fault 104-2 that displaces the layers down. In one or more embodiments, the depiction shows three geometrically different boreholes 103-1, 103-2, and 103-3 (collectively referred to as boreholes 103) in the subterranean formation 101, from which cores and other geophysical logs are acquired.

In FIG. 1, a coring operation is depicted as being performed by a coring bit and a coring barrel attached to a pipe string and sent down into boreholes 103 to cut cores 105A and 105B from certain borehole intervals, where the degree of borehole inclination could be either vertical 103-1, horizontal 103-2, or any inclination degree between thereof. The operation concludes by pulling the core up to the well head at surface and extracting it from the coring barrel.

Boreholes are surveyed to define their exact geometry and location in the three dimensional (3D) space of subterranean regions. Borehole surveys include depths, inclination degree between 0° and 90° from vertical reference (0°), and azimuth degree between 0° and 360° from Magnetic North (0°). Vertical boreholes have no inclination or azimuth degrees, and so their survey measurements are set to 0°.

Geological features in the subterranean regions, whether linear like a fracture trace or planar like a fracture wall, are referenced in the 3D space by dip and strike degrees as shown at reference number 106. Dip is the angle between the feature plane and the horizontal plane, and measured between 0° and 90° (106). The dip is measured for the true dip, which is the steepest angle of an inclined plane in the direction perpendicular (normal, 90°) to the plane strike (106). The strike is measured for the line created by the intersection of the feature plane and a horizontal plane in azimuth degrees, from 0° to 360°.

There are many possibilities to encounter different elliptical shapes for the intersection between core 105A and a fracture 105-1 in the subterranean region. To identify location and geometry of fractures in subterranean regions from the intersection shape, the acquired core is marked at the well site with corresponding depths. The marks of depth define the distance, in a measuring system such as the metric system, from well head. The core 105B is also marked for orientation using a reference line 105-2, or several lines, defining either a compass cardinal point (N, E, S, and W), or other core references such as top, bottom, upper, and down sides.

The core and its borehole share the same depths, degree of inclination, and degree of orientation, but differ slightly in the diameter, for the core being smaller than its borehole dimeter. Borehole images and other logs such as Gamma Ray can also be used at the laboratory to match exact depths of core and logs. The borehole images can also be used to orient core and to identify dips and strikes of fractures, veins, and bedding planes.

Figure 2:
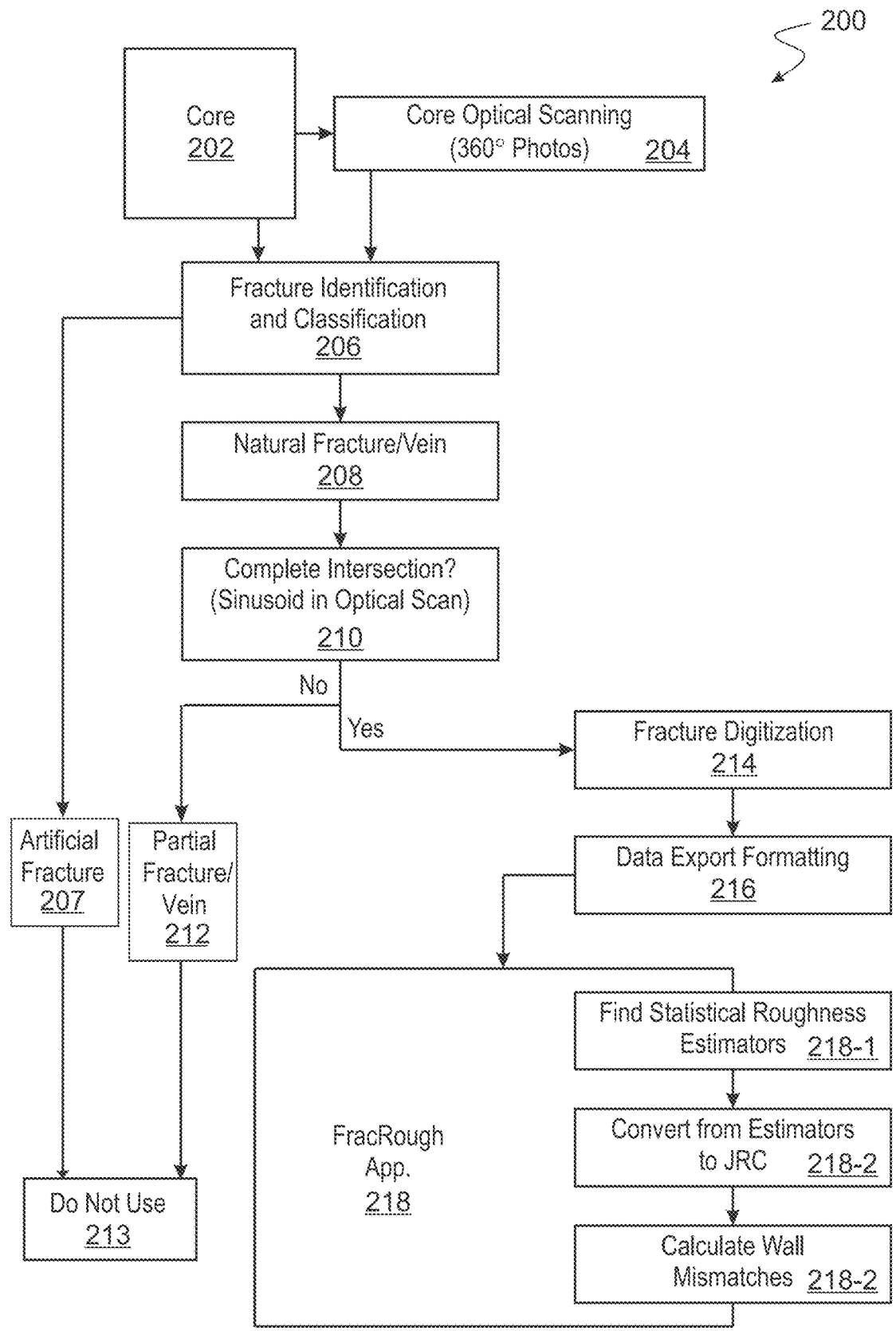
FIG. 2 shows a workflow for determining fracture roughness from a core.

FIG. 2 is a flow chart describing a workflow 200 for determining fracture roughness from a core. In examples, the workflow 200 measures roughness and wall mismatches of fractures and veins in subterranean formations using core exterior photos, digitization, and a fracture roughness algorithm as described herein. The core 202 is obtained from a well site and scanned 204. In examples, the core is scanned in a laboratory using an industrial scanner, which can produce 360° optical images of a core exterior in true color with a resolution of up to 10 pixel/mm, and details up to 40 pixel/mm.

Fractures and veins are identified using a sequential filtering process applied to the core 202 and core images 204. To determine fracture roughness and wall mismatches, the cores satisfy a predetermined geometry that intersects reservoir fractures. Additionally, the cores used to determine fracture roughness and wall mismatches are of a solid cylindrical shape. Fractures in fragmented and damaged cores are not used. Further, fractures lacking planar or complete intersections are not used. As shown in FIG. 2, fracture identification step 206 separates reservoir fractures from those artificial fractures that resulted from core damage. The criteria to distinguish natural fractures (joints, veins, and faults) from other artificial fractures generally are described in the sequential filtering process described in FIG. 3A.

Figure 3A:
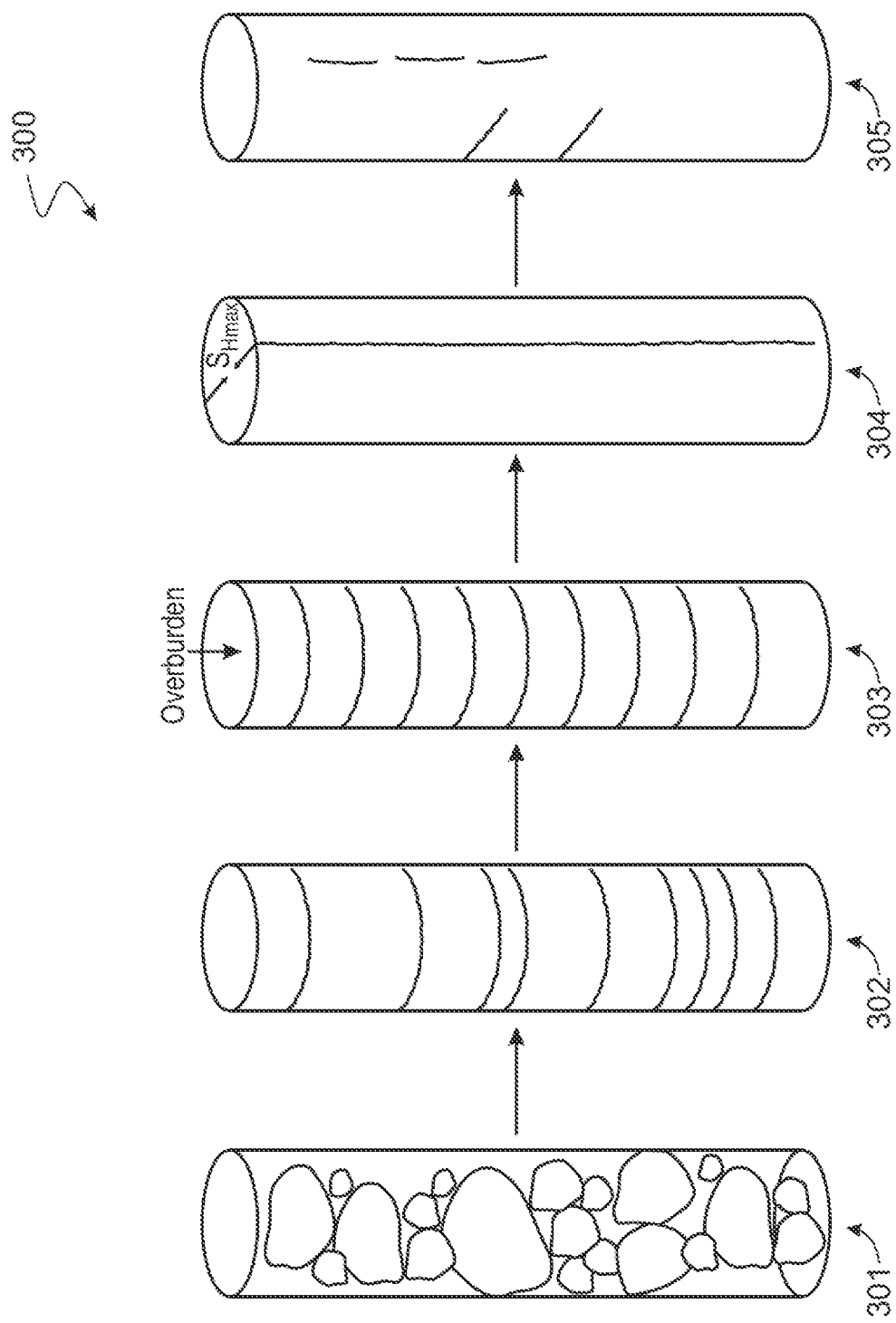
FIG. 3A shows a sequential filtering process.

Referring to FIG. 3A, a sequential filtering process is shown. Criteria are applied in a sequential filtering process 300 in FIG. 3A, by which core fractures are identified and filtered into (1) damages. (2) artificial fractures, (3) veins and natural fractures of incomplete intersection, and (4) veins and natural fractures of complete intersection. The latter, (4), is the category used for determining fracture roughness and wall mismatches. The sequential filtering is performed according to the interrelated geometrical components in the 3D space of: (1) cored rock strata, (2) core, and (3) core fractures. Utilized attributes include information of core shape, location, and orientation with respect to the strata setting, present-day stress field, fracture dip, fracture mineralization and lack thereof, wellbore survey, hole caliber, and lithological properties.

At reference number 301, the core images and/or cores are evaluated to exclude intervals of core crumbles, obtained from a drilling process or core lab. In examples, core crumbles include naturally soft lithofacies, such as friable shale. Cores used to determine fracture roughness or wall mismatches are of an ideal geometry to intersect reservoir fractures, and of a solid cylindrical shape for scanning and digitization. In examples, the ideal geometry of a core includes a core extracted at a hole trajectory that intersects reservoir fractures, such as the boreholes 103-2 and 103-3 shown in FIG. 1 that traverse vertical fractures in flat layers.

At reference number 302, the core images and/or cores are evaluated to exclude core fractures that represent bed splitting using bed dips, core orientation, and lithofacies identification. For example, in the case of a vertical core acquired from flat bedded carbonates, the angle of intersection is normal (90 deg.) between the core axis and bedding planes. For this case, a predetermined threshold (such as a cutoff (>85 degrees)) may be introduced for the automation process to filter all core splits along bed planes, accounting for some deviations (of either core from the vertical or bedding planes from the horizontal plane). Excluding fractures that represent bed splitting uses information of wellbore inclination whether vertical (V), deviated (D) or horizontal (H) or using digital values from well survey trajectory for the cored interval (FIG. 1).

At reference number 303, the core images and/or cores are evaluated to exclude core disking, which are frequent fractures with similar spacing along an interval of hard "non-naturally-fractured, non-stratified" rock that developed during the unloading of the axial (vertical) stress (overburden).

At reference number 304, the core images and/or cores are evaluated to exclude core fractures if the core is from a vertical hole and the fractures are vertical with planes (azimuth) parallel to the maximum horizontal stress $S_{Hmax}$ in the region.

At reference number 305, the core images and/or cores are evaluated to exclude veins and other fractures of partial intersections (side cracks). The sequential filtering as described at reference numbers 301, 302, 303, and 304 results in the filtering of artificial fractures as shown at block 207 of FIG. 2. The sequential filtering as described at reference number 305 determines natural short veins and core cracks, regardless if they are artificial or natural as shown at block 212 of FIG. 2.

Referring again to FIG. 2, artificial fractures 207, and the reservoir fractures and veins whose the core partially intersected 212 are excluded 213 from further processing, including digitization and subsequent roughness measurements. The roughness measurements are determined for those cores including reservoir fractures of complete intersections. Accordingly, after fracture identification and classification using sequential filtering at block 206, the natural fractures/veins remaining from the sequential filtering are obtained at block 208. At block 210, the natural fractures and veins are evaluated to determine if the natural fractures and veins represent complete intersections. As described above, partial intersections are excluded from further processing at blocks 212 and 213. Natural fractures and veins are used in fracture digitization at block 214.

The selected fractures and veins are traced and digitized from the core photos. The digitization at block 214 is performed using a design or drafting application, such as an AutoCAD platform. In examples, an Auto LISP script is used to format and export the digital profiles as shown at block 216. In digitization at block 214, the identified natural fractures in the core images are precisely traced to obtain a pair of ellipses corresponding to a top wall and a base wall of the identified natural fractures. For example, the rock wall edges separated by a fracture are traced from the core photos regardless of the size of the fracture width, and whether the fracture width was a gap or filled with minerals as in the case of veins. The fracture width corresponds to a gap area (aperture) between the pair of nearly identical sinusoids, one for the top wall and the other for base wall. The digitization can be done in segments where edges are marked as points to form a trace for fracture intersection. In examples, the script works as module to convert geometrical information into numerical values. In particular, the script traces the physical images of the cores into digital form (scan) and then transform lines and polylines into numerical values. The transformation retains the spatial information so each point is referenced to the line or polyline. The digitization process includes four steps: 1) tracing fractures (edges), 2) digitizing fractures into lines/polylines, 3) transforming lines/polylines into numerical values, then 4) formatting as x-y coordinates for each line/polyline. The resulting formatted digital profiles are data points in x-y coordinates representing the sinusoids of fractures and veins at sampling intervals of a minimum 0.5 mm. In examples, the data points of the digital profiles are imported to an application that executes a fracture roughness algorithm at block 218 to enable calculation of statistical estimators 218-1, conversion to JRC values 218-2, and estimation of the mismatches between fracture walls 218-3. The functions, computational steps, and equations of the fracture roughness algorithm are provided below.

Figure 3B:
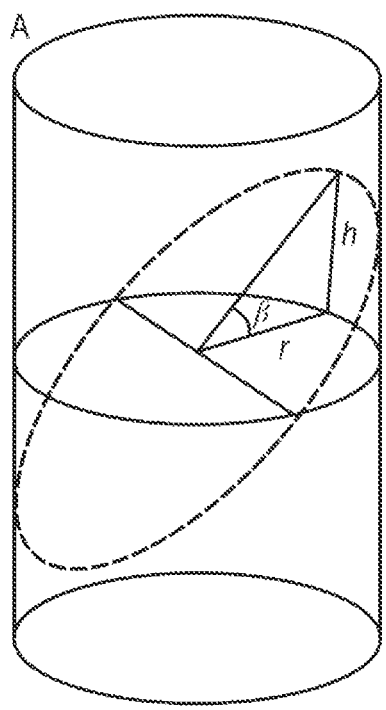
FIG. 3B depicts the shape of a fracture plane cutting a core.

FIG. 3B depicts the shape of a fracture plane cutting a core, visualized in 3D space, and the equivalent shape of the fracture in the unrolled core photo. In particular, FIG. 3B shows geometrical parameters used to describe the ellipse of a fracture plane cutting a core in (A) 3D space, and FIG. 3C shows the equivalent sinusoid in 2D space in the core unrolled photo.

In FIG. 3B, the fracture is depicted as a smooth plane (i.e., without roughness) to show the fundamental parameters used to describe a sinusoid. In FIG. 3B, the intersection of a plane with a cylinder is an ellipse, and the intersection makes a circle if the plane is normal to the cylinder. Unrolling the cylinder surface into the plan view turns the ellipse into a sinusoid as shown in FIG. 3C.

The intersection of a fracture can be mathematically described by the following formula, $h=r \tan \beta$, where $\beta$ is the angle between the fracture and the core axis, $r$ the core radius, and $h$ the half of the fracture intersection height along the core axis. The equivalent sinusoid, in FIG. 3C, can be described by the following formula, $y=h \sin(x/r)$, where $h$ is the sinusoid half amplitude. The sinusoid wavelength ($2\pi r$) equals the cylinder perimeter. The lengths of fracture digital profiles vary according to their elliptical intersection perimeters and fracture height, $2h$.

Figure 3C:
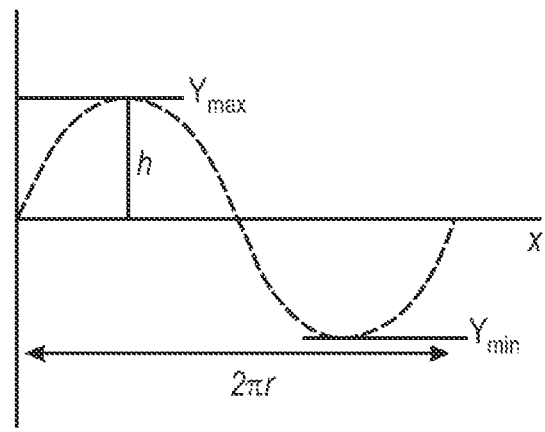
FIG. 3C shows the equivalent sinusoid in 2D space in the core unrolled photo.
Figure 4:
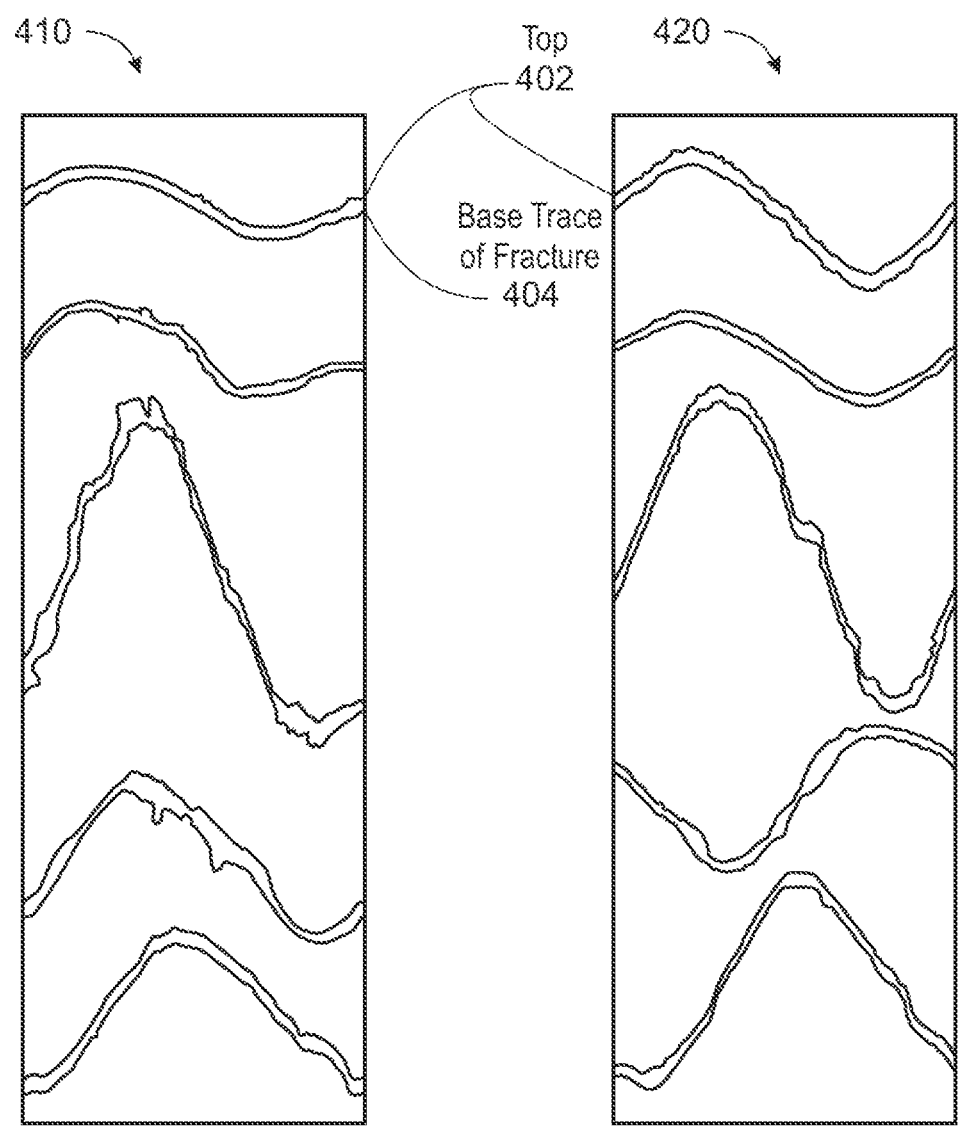
FIG. 4 shows digital profiles of actual reservoir fractures and veins.

A planar smooth fracture makes a sinusoid like the one shown in FIG. 3C. However, the fractures naturally have different degrees of roughness. FIG. 4 shows digital profiles of reservoirs fractures 410 and veins 420, digitized from core exterior photos and the profiles separated for top walls 402 and base walls 404 of fractures and veins. In FIG. 4, the fracture profiles are digitized from 360° photos of core. The digital profiles in FIG. 4 are in pairs for top and base walls of fractures and veins from two cores of different orientation, inclination, and diameters. The fractures and veins are of vertical dips, akin to the depiction in FIG. 1.

The digital profiles in FIG. 4 include information such as fracture strikes, dips, amplitude and roughness with respect to the strike, dip, and diameter of the core. Measuring the roughness from the digital profiles, like those in FIG. 4, uses computational techniques that process geometrical variables for profiles of different shapes and sizes. The vertical and horizontal scales of the fracture profiles produced from 360° core photos are also measured, because the roughness measurements are scale-dependent.

Figure 5:
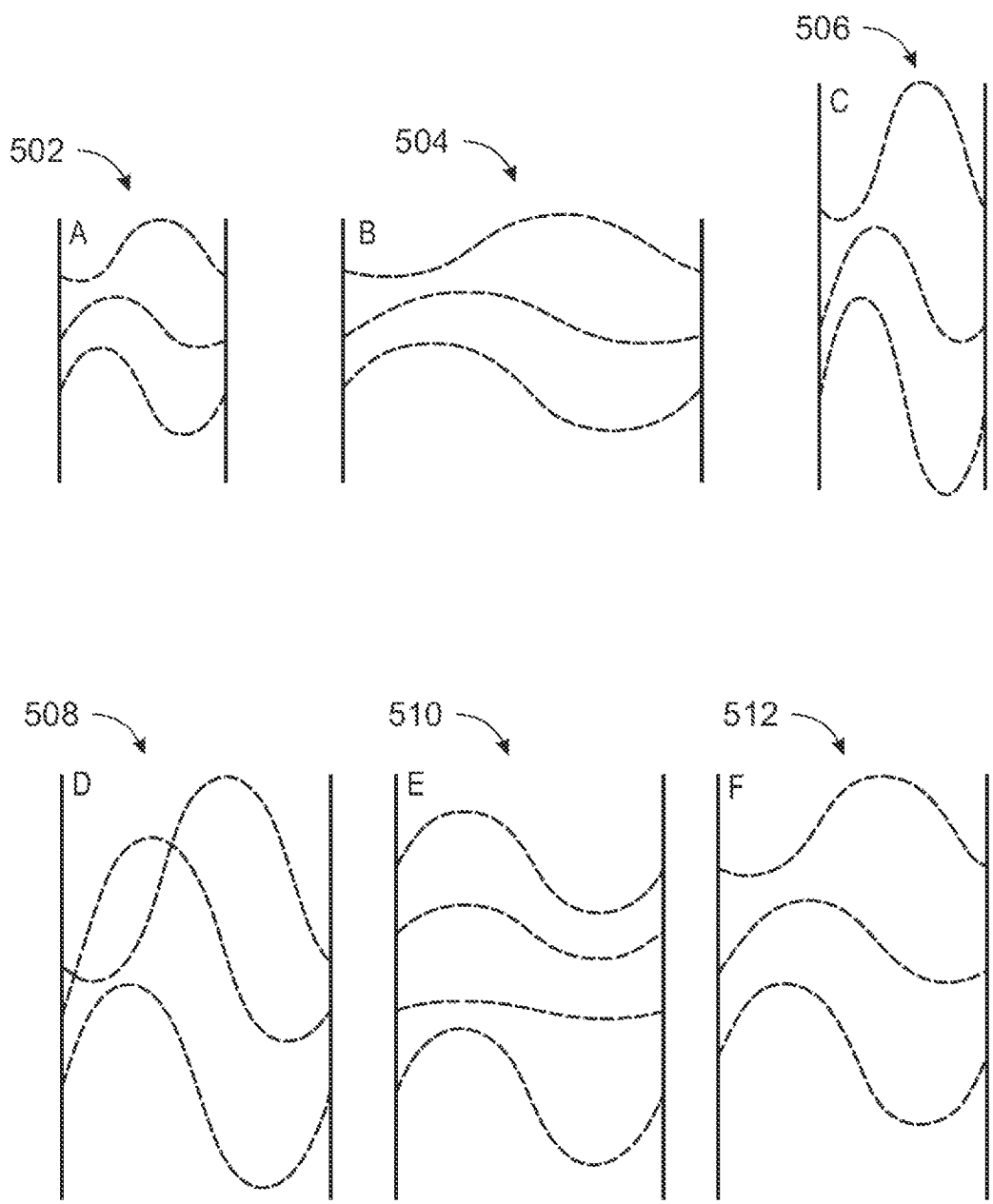
FIG. 5 shows views of various scale, strike, and dip.

FIG. 5 shows views of various scale, strike, and dip. In particular, views 502, 504, and 506 show vertical and horizontal scales of the fracture digital profiles, and views 508, 510, and 512 show varying strike and dip. The magnitudes of amplitude and phase angle of the fracture sinusoids in core photos reflect the fracture geometry in the subterranean region with respect to the core geometry. In view 502, fractures with same dip but different strike are shown. In view 504, fractures with same strike but different dip angle are shown. In view 506, fractures with different dip and strike relative to borehole are shown.

Views 502, 504, and 506 show different scenarios for vertical and horizontal scales of the fracture digital profiles. The vertical and horizontal scales of profiles determine the amplitude and hence the dip angle β. View 508 shows fractures with similar dip and different strike, view 510 shows fractures with similar strike and different dip, and view 512 shows fractures with different dip and strike relative to the borehole axis.

Figure 6:
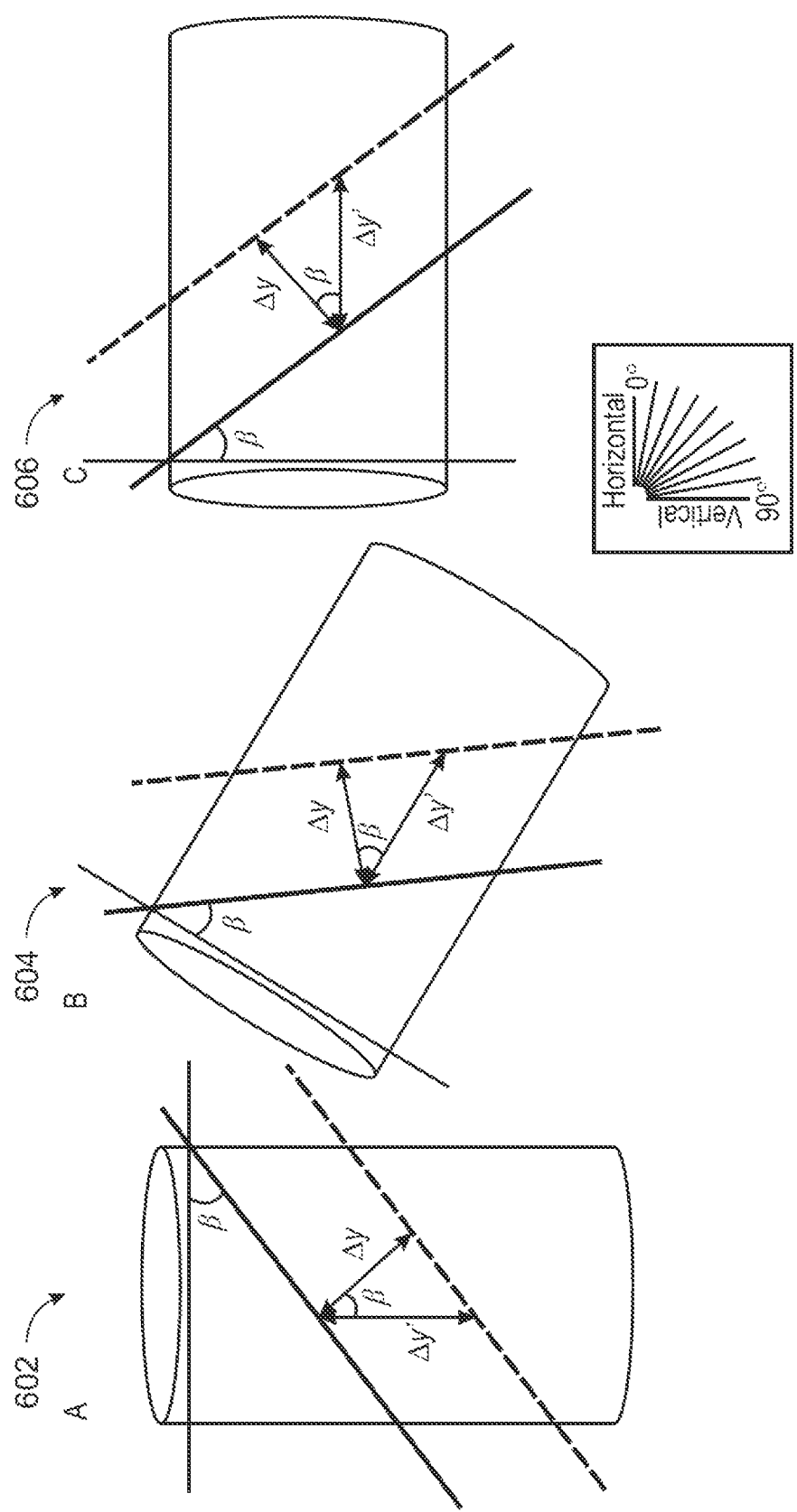
FIG. 6 shows the difference between fracture thicknesses across different fracture types.

FIG. 6 shows the difference between fracture thicknesses across different fracture types. The difference between true and apparent fracture thickness, the distance between top and base wall of a fracture intersected by a vertical core 602, an inclined core 604, and a horizontal core 606 is shown. The difference between true and apparent fracture thickness is the distance between top and base profiles of a fracture. True thickness is the shortest distance measured normal to the fracture plane. True thickness can be calculated from the apparent thickness, the distance appearing along the borehole or core axis. In FIG. 6, the normal distance between a fracture profile and a fitted sinusoid (Δy') is multiplied by the cosine of β to obtain the shortest distance between the fracture and the core axis, Δy. The determination of true thickness in FIG. 6 is equivalent to flattening the sinusoid and the corresponding fracture profile, and therefore it makes the measurements easier without the need to account for the core inclination.

Figure 7:
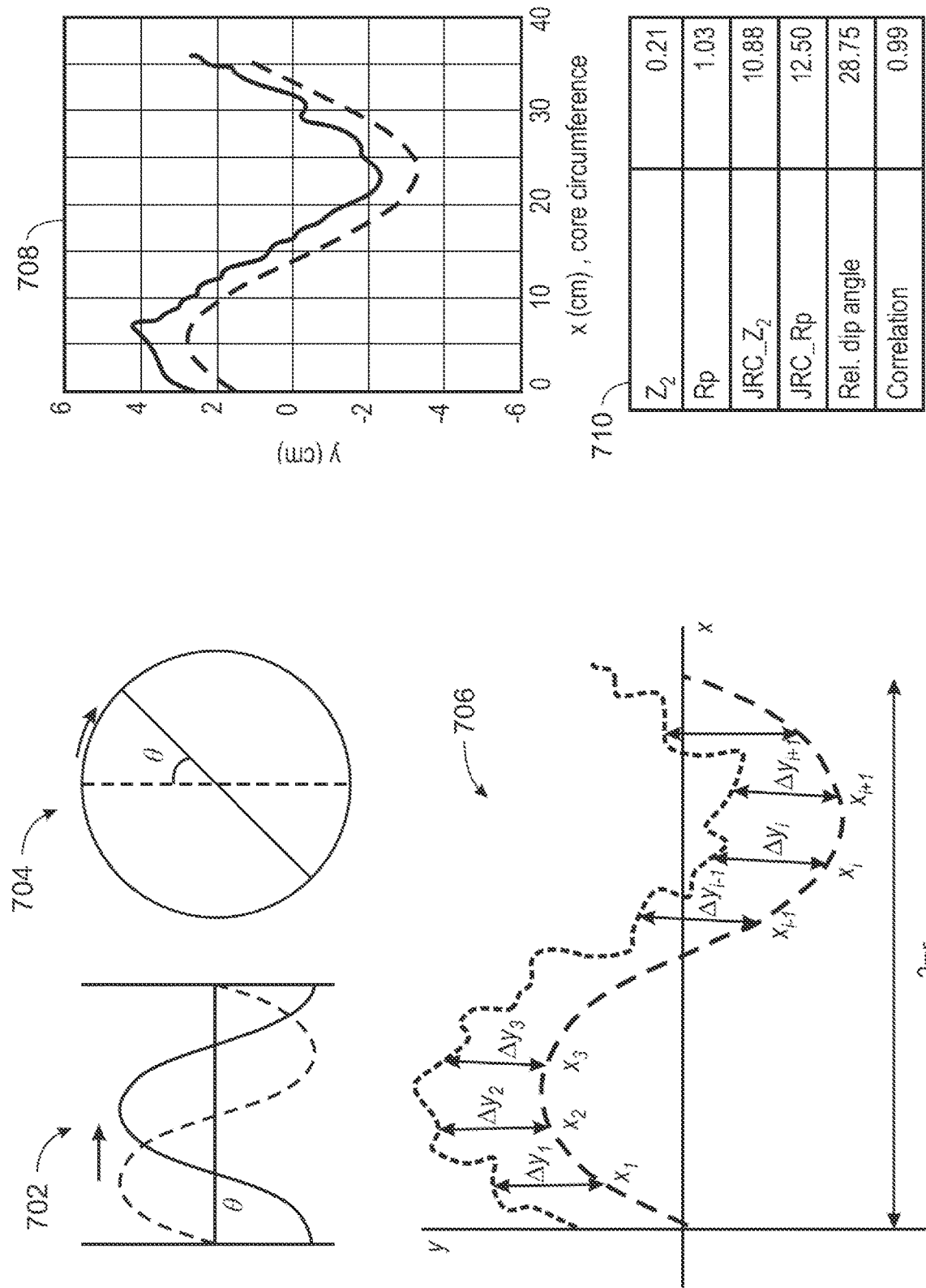
FIG. 7 shows the shifting of sinusoids to obtain a best fit with an actual example of obtained roughness measurements.

FIG. 7 shows the shifting of sinusoids to obtain a best fit. At reference number 702, searching for best fitting sinusoids to a fracture profile by shifting is shown. At reference number 704, the equivalent of shifting by changing phase angle or the fracture strike relative to core is shown. At reference number 706, a best fit calculated from the sum of differences between the profile and a best fitting sinusoid. At reference 708, a profile of an actual fitted fracture is shown with its measurements 710.

The concept based on which a sinusoid fits a fracture profile is depicted in FIG. 7. The strike relative to core determines the phase angle of the sinusoid relative to the starting point (reference) of the fracture profile. Finding the best fitting sinusoid to a fracture profile is by (i) determining the amplitude of the sinusoid, and (ii) incrementing the phase angle by a small amount, starting from $-2\pi r$, repeatedly until the best fit is observed. The phase increment $\Delta\phi$ determines the accuracy and time of convergence. However, if the phase increment is too small (i.e., smaller than the minimum sampling interval), the search may not converge to the solution and instead get trapped in a local minimum. In such a case, the phase increment must be increased and the search repeated. The irregular nature of fracture profiles may introduce some errors in amplitude calculation but the errors are small and negligible for roughness calculations.

FIG. 7 at reference number 706 shows a best fit. As shown at reference number 706, the best fitting position of the sinusoid minimizes the JRC, which is calculated from the sum of differences ($\Delta yi$) between the sinusoid and the fracture profile at consecutive measurement points (xi). In examples, the best fitting sinusoid is obtained using criteria such as the area between the fracture profile and a fitting sinusoid. The sampling point intervals of the profiles may or may not be equivalent to the top and base profiles of a fracture.

The fracture roughness algorithm calculates the degree of roughness from complex and variable sinusoids shown at reference number 706 with a dotted, jagged, variable sinusoid. A sinusoid (shown with a dashed, smooth, sinusoid) is fit to the general shape of an irregular digital profile. The fitted sinusoid matches the geometrical information of the fracture digital profile, except that the sinusoid has no roughness (JRC=0).

In examples, the fracture roughness algorithm is based on Excel Visual Basic for Application (VBA). However, the fracture roughness algorithm can be implemented using any language, including but not limited to, VBA or C++ and the like. The fracture roughness algorithm obtains as input several fracture profiles in one batch from core samples of similar diameters (circumference).

The kernel and processes of the fracture roughness algorithm are as follows: Input parameters include, for example, core and fracture id, vertical scale Ey, horizontal scale Ex, core circumference, c, and a vertical shift of sinusoid to be fitted, Δh. The vertical shift is arbitrary and only for better visual inspections by users to separate fracture profile from the fitted sinusoid. Input data includes digitized profiles. In examples, the fracture roughness algorithm obtains digitized profiles of fractures and veins and converts them into arrays xi and y(i) . . . for i=1 to the number of x y reading points, n, where x is the distance from a starting point normal to the core axis and y is the distance from reference x axis normal to core axis.

In examples, the scales and parameters of input data are adjusted. Adjusting for the horizontal scale. $E_y$ and vertical scale, $E_x$ is performed using the following equations:

$$y_i = y_i * E_y \quad (1)$$

$$x_i = x_i * E_x \quad (2)$$

The core radius, r, is calculated from the core circumference, c, as follows:

$$r = \frac{c}{2\pi} \quad (3)$$

The radius of the core can be calculated from the circle circumference or vice versa.

Next, the half amplitude, h, of the sinusoid can be calculated as follows:

$$h = \frac{(y_{max} - y_{min})}{2} \quad (4)$$

Where $y_{max}$ and $y_{min}$ are the maximum and minimum y values along the fracture profiles relative to a horizontal line normal to the core axis (FIG. 3A).

Next, β, the fracture angle relative to borehole is calculated as follows:

$$\tan(\beta) = \frac{h}{r} \quad (5)$$

An initial phase 2πr is set to fit the sinusoid to the fracture profile. The following two steps (Equations 6 and 7) are repeated until the best phase angle ϕ is found:

First, calculate sinusoid values, $s_i$ into sinusoid array, s, at xi measurement points. x spans the entire core circumference, which equals 2πr:

$$s_i = h\sin\left(\frac{x_i}{r} + \phi\right) + \Delta h \text{ for } 0 < x_i < 2\pi r \quad (6)$$

Second, the difference between the sinusoid, $s_i$, and the fracture profile, $y_i$ is determined at each measurement point:

$$\Delta y_i = \Delta y'\cos(\beta) = (y_i - s_i)\cos(\beta) \quad (7)$$

The statistical estimators are calculated as follows:

First, calculate $Z_2$ value according to the following formula:

$$Z_2 = \left(\frac{1}{c}\sum_{i=1}^{n-1} \frac{(\Delta y_{i+1} - \Delta y_i)^2}{(x_{i+1} - x_i)}\right)^{1/2} \quad (8)$$

Where c is the core circumference and n is the number of measurement points.

Second, the $Z_2$ values are monitored. If $Z_2$ has reached minimum, the best fitting sinusoid is found (FIG. 6). The values of the sinusoid, $s_i$ along with the scale corrected $x_i$, $y_i$ and $\Delta y_i$ values are output. In examples, the minimum difference $(y_i - s_i)_{min}$ is output by eliminating the arbitrary vertical shift Δh.

Otherwise, increment the phase angle, ϕ, by Δϕ:

$$\phi = \phi + \Delta\phi \quad (9)$$

And, then repeat the fitting using Equations 6-9.

After the statistical estimators are determined, calculate Rp value according to the following formula:

$$R_p = \frac{1}{L}\sum_{i=1}^{n-1}\left((y_{i+1} - y_i)^2 + (x_{i+1} - x_i)^2\right)^{1/2} \quad (10)$$

To convert the statistical estimators to a JRC, established relationships are used. Empirical formulas representing the relationship between statistical roughness estimators and the JRC scale are provided below:

Calculate JRC from $Z_2$ as follows:

$$JRC\_Z_2 = 51.16 Z_2^{0.531} - 11.44 \quad (11)$$

Calculate JRC from $R_p$ as follows:

$$JRC\_R_p = 65.9(R_p - 1)^{0.302} - 9.65 \quad (12)$$

The results are output, including amplitude, h, circumference, c, radius, r, relative dip angle, β, final phase angle, ϕ, correlation between sinusoids and fracture profiles, R, $Z_2$, RP, JRC_$Z_2$, and JRC_RP. FIG. 7 shows an actual fracture profile at reference number 708 with a solid line, and fitted sinusoid using a dashed line. The correlation between the fracture profile and fitted sinusoid, along with the calculated JRC are shown at reference number 710. The sinusoid is shifted down by an arbitrary Δh for a display purposes. As an example, reference numbers 708/710 show an output after processing a profile of an actual fracture with fitted sinusoid and calculated $Z_2$, $R_P$ and JRC values. In examples, the results (e.g., outputs) for all the fracture profiles in a batch are placed in a summary table further analysis. In examples, the results are arranged for statistical analyses such as probability distributions of JRC values and analyses of fracture wall mismatches.

In some examples, wall mismatches are calculated. The first step in calculating wall mismatches is to resample measurement of top and base profiles, because the top and base profiles have y values at the same x points. The profile with lower number of measurement points is resampled at the measurement points of the profile with higher number of points. This resampling compares the number of measurements of the top and base profiles and selects the one with larger number of measurements as the reference profile to resample the other one. Resampling lines and curves consists of finding the y value of the resampled profile at measurement points $x_i$ of the reference profile by linear interpolation between y values at x points before and after $x_i$.

After profile resampling, the following statistical techniques are applied to derive degree of wall mismatches between top and base profiles from the tabulated results. First, calculate correlation coefficients, $r_f$. Top and base profiles are compared at each sampled point ($x_i$, $y_i$, $\Delta x_i$ and $\Delta_{yi}$) to derive a correlation coefficient for each fracture as follows:

$$rf = \sqrt{\frac{\sum x_i y_i}{n\sigma_x \sigma_y}} \quad (13)$$

Where $\sigma_x$ is the standard deviation of data $x_i$, $\sigma_y$ is the standard deviation of data $y_i$, and n is the data points.

Next the standard deviation of the apertures, $S_a$ is calculated as follows:

$$S_a = \sqrt{\frac{\sum_{i=1}^{n}(x_i - \overline{X})^2}{n-1}} \quad (14)$$

Where $\overline{X}$ is the mean of $x_i$.

The wall mismatches calculations are then output. In examples, a summary table listing the fracture id, correlation coefficient, aperture index, aperture standard deviation and JRC values are output. In Equations 8 and 10 above, $Z_2$ and $R_P$ were shown as examples of the statistical estimators for roughness. $Z_2$ was reported in the literature as one of the best roughness estimators because it correlates well with the JRC scale. $R_P$ can also be calculated as an alternative JRC estimator. Since $Z_2$ and $R_P$ depend on the difference between adjacent measurements, the arbitrary vertical shift $\Delta h$ is irrelevant. Note that $Z_2$ is dependent on the sampling intervals, and the present techniques use a minimum sampling interval of 0.5 mm.

The $Z_2$ parameter is used to estimate JRC to avoid eventual recalculation of $Z_2$ and also because the objective is to determine the minimum value of $Z_2$. If the correlation is too low, the fracture profile is too irregular to fit a sinusoid and hence the resulting JRC value is not reliable.

In examples, the JRC varies between 0 and 1, where 0 means perfectly matching walls for fractures and veins. The higher the correlation the lower the wall mismatch, and vice versa. The standard deviation of apertures reflects deviation from matching walls, regardless the aperture size, as it is not by itself a measure for wall mismatch. If there is a high degree of correlation between top profile and base profile, there is only separation between the fracture walls with no or little sidewise shift. In this case, the standard deviation of aperture variation along the fracture is expected to be small. Standard deviation of aperture is therefore related to the JRC. If both top profile and base profile have low JRC, the standard deviation of aperture will be low. Fractures with high JRC value for top and base profiles are likely to have a high standard deviation of apertures if the fractures are of mismatching walls.

In examples, in the format of the present fracture roughness algorithm, the first batch of results (e.g., outputs) includes values of JRC precursors, $Z_2$, $R_P$ and correlation between the fitted sinusoid and actual fracture profile. In examples, the second batch is presented right next to the first batch, and includes the resampled top and base profiles for each fracture and a table with top-base correlation, aperture, aperture standard deviation and respective JRC values.

For ease of description, the present techniques are described in association with reservoir characterization by the oil and gas industry. It will be appreciated that the present techniques may be implemented for descriptions of fracture roughness from core associated with any subsurface operations, such as mining, civil engineering, carbon sequestration, water aquifer management, and acquisition of geomaterials in cylindrical shapes, and techniques may be applied as hardware, firmware, software or a combination thereof.

Figure 8:
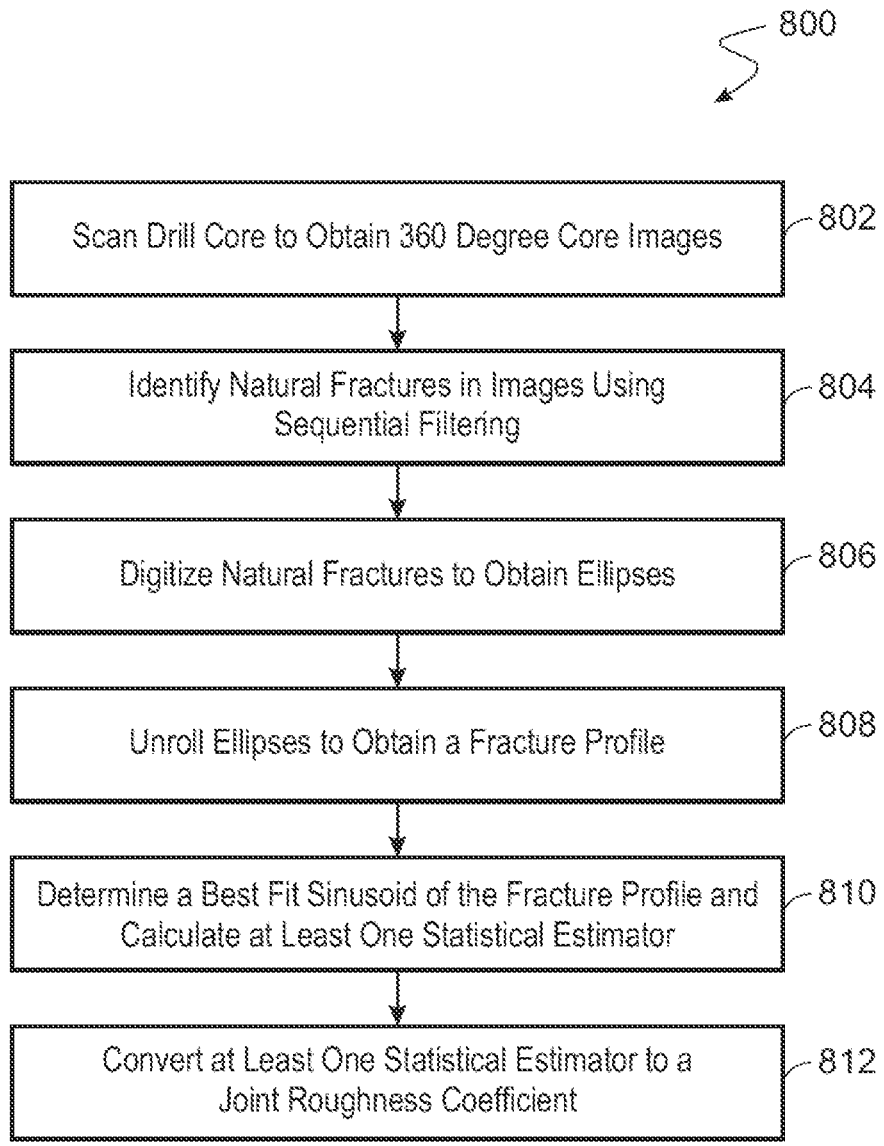
FIG. 8 is a process flow diagram of a process that enables a determination of fracture roughness.

FIG. 8 is a process flow diagram of a process that enables a determination of fracture roughness. At block 802, a drill core is scanned to obtain 360 degree core images. At block 804, natural fractures are identified in the core images, wherein the identification of natural fractures is done using sequential filtering. For example, the sequential filtering includes: excluding from further processing core images that show fractures formed by damage to the drill core; excluding from further processing core images that show bed splitting; excluding from further processing core images that show disking; excluding from further processing core images that show vertical fractures with planes parallel to a direction of maximum horizontal stress when the core is obtained from a vertical borehole; and excluding from further processing veins and other fractures of partial intersections.

At block 806, the identified natural fractures in the core images are digitized to obtain a pair of ellipses corresponding to a top wall and a base wall of the identified natural fractures. At block 808, the pair of ellipses is unrolled into a fracture profile comprising a pair of sinusoids corresponding to the top wall and the base wall of the identified natural fractures. At block 810, a best fitting sinusoid of the fracture profile is determined, wherein at least one statistical estimator is calculated using the difference between the best fitting sinusoid and the fracture profile. At block 812, the calculated statistical estimators are converted to a joint roughness coefficient.

Figure 9:
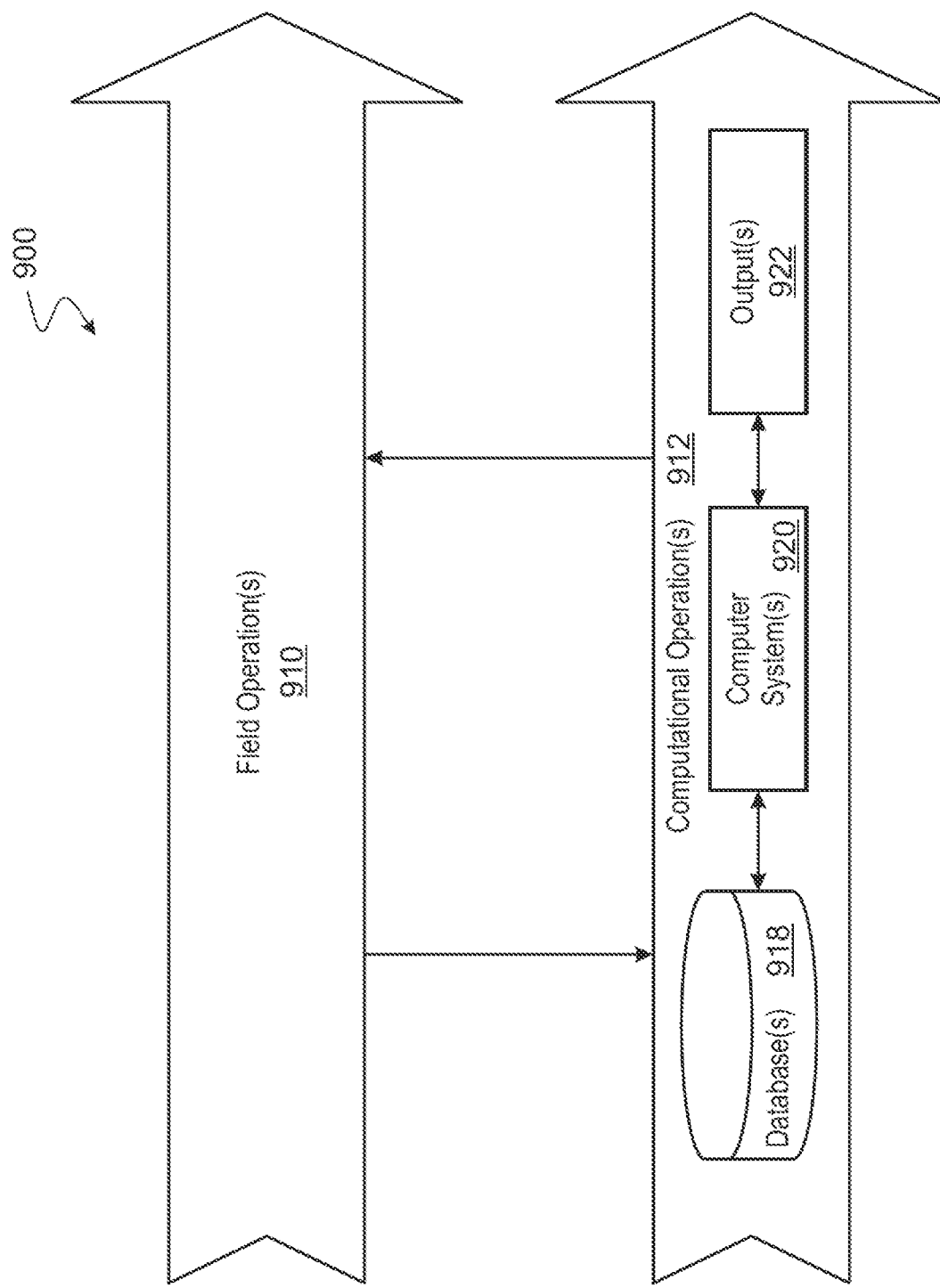
FIG. 9 illustrates hydrocarbon production operations that include both one or more field operations and one or more computational operations.

FIG. 9 illustrates hydrocarbon production operations 900 that include both one or more field operations 910 and one or more computational operations 912, which exchange information and control exploration for the production of hydrocarbons. In some implementations, outputs of techniques of the present disclosure can be performed before, during, or in combination with the hydrocarbon production operations 900, specifically, for example, either as field operations 910 or computational operations 912, or both.

Examples of field operations 910 include forming/drilling a wellbore, hydraulic fracturing, producing through the wellbore, injecting fluids (such as water) through the wellbore, to name a few. In some implementations, methods of the present disclosure can trigger or control the field operations 910. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 910 and responsively triggering the field operations 910 including, for example, generating plans and signals that provide feedback to and control physical components of the field operations 910. Alternatively or in addition, the field operations 910 can trigger the methods of the present disclosure. For example, implementing physical components (including, for example, hardware, such as sensors) deployed in the field operations 910 can generate plans and signals that can be provided as input or feedback (or both) to the methods of the present disclosure.

Examples of computational operations 912 include one or more computer systems 920 that include one or more processors and computer-readable media (e.g., non-transitory computer-readable media) operatively coupled to the one or more processors to execute computer operations to perform the methods of the present disclosure. The computational operations 912 can be implemented using one or more databases 918, which store data received from the field operations 910 and/or generated internally within the computational operations 912 (e.g., by implementing the methods of the present disclosure) or both. For example, the one or more computer systems 920 process inputs from the field operations 910 to assess conditions in the physical world, the outputs of which are stored in the databases 918. For example, seismic sensors of the field operations 910 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 912 where they are stored in the databases 918 and analyzed by the one or more computer systems 920.

In some implementations, one or more outputs 922 generated by the one or more computer systems 920 can be provided as feedback/input to the field operations 910 (either as direct input or stored in the databases 918). The field operations 910 can use the feedback/input to control physical components used to perform the field operations 910 in the real world.

For example, the computational operations 912 can process the seismic data to generate three-dimensional (3D) maps of the subsurface formation. The computational operations 912 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 912 to process new information about the formation and control the drilling to adjust to the observed conditions in real-time.

The one or more computer systems 920 can update the 3D maps of the subsurface formation as information from one exploration well is received and the computational operations 912 can adjust the location of the next exploration well based on the updated 3D maps. Similarly, the data received from production operations can be used by the computational operations 912 to control components of the production operations. For example, production well and pipeline data can be analyzed to predict slugging in pipelines leading to a refinery and the computational operations 912 can control machine operated valves upstream of the refinery to reduce the likelihood of plant disruptions that run the risk of taking the plant offline.

In some implementations of the computational operations 912, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ins), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 10:
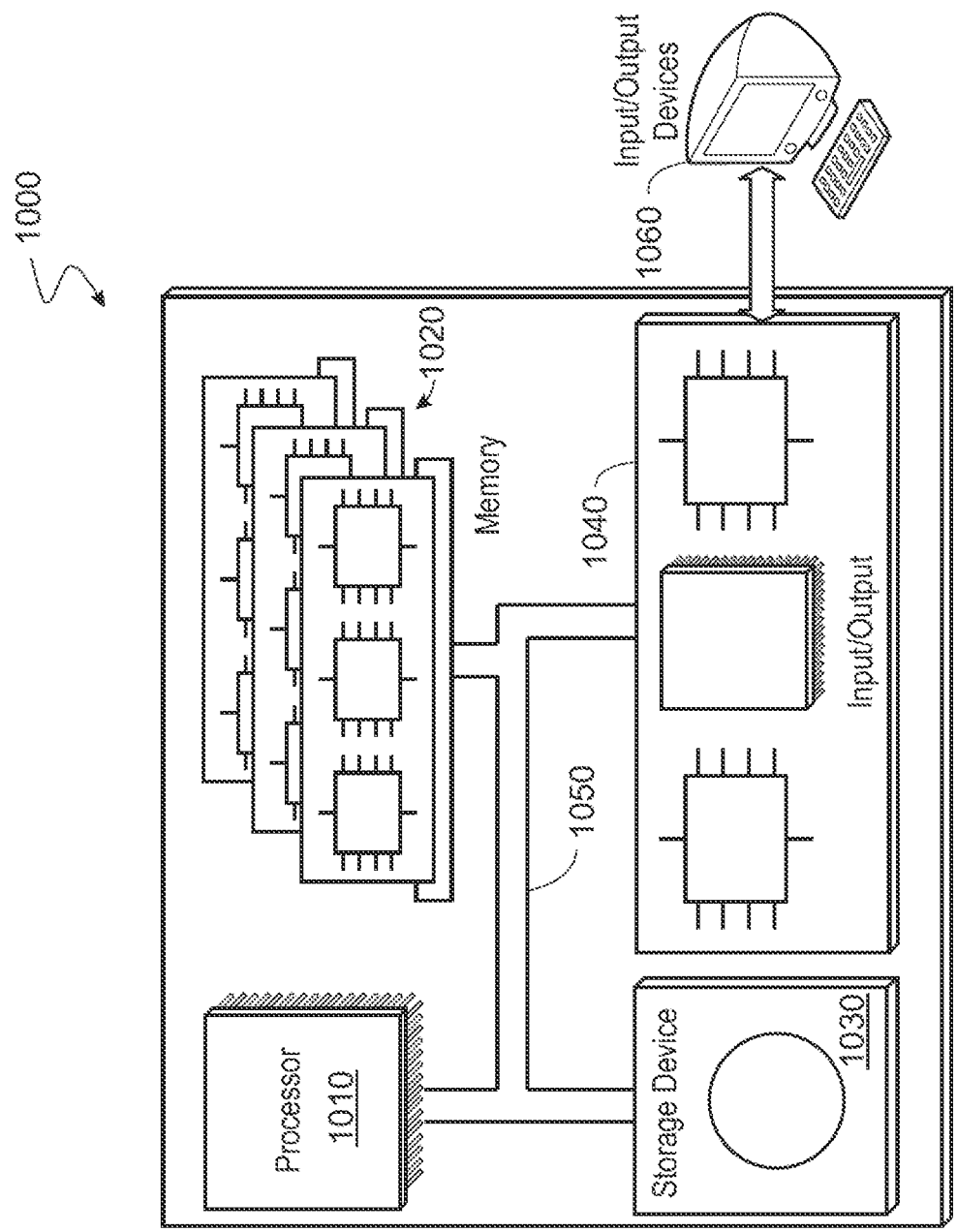
FIG. 10 is a schematic illustration of an example controller for determining fracture roughness according to the present disclosure.

FIG. 10 is a schematic illustration of an example controller 1000 (or control system) for determining fracture roughness according to the present disclosure. For example, the controller 1000 may be operable according to the workflow 200 of FIG. 2 or the process 800 of FIG. 8. The controller 1000 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1000 includes a processor 1010, a memory 1020, a storage device 1030, and an input/output interface 1040 communicatively coupled with input/output devices 1060 (for example, displays, keyboards, measurement devices, sensors, valves, pumps). Each of the components 1010, 1020, 1030, and 1040 are interconnected using a system bus 1050. The processor 1010 is capable of processing instructions for execution within the controller 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output interface 1040.

The memory 1020 stores information within the controller 1000. In one implementation, the memory 1020 is a computer-readable medium. In one implementation, the memory 1020 is a volatile memory unit. In another implementation, the memory 1020 is a nonvolatile memory unit.

The storage device 1030 is capable of providing mass storage for the controller 1000. In one implementation, the storage device 1030 is a computer-readable medium. In various different implementations, the storage device 1030 may be a floppy disk device, a hard disk device, an optical disk device, or a tape device.

The input/output interface 1040 provides input/output operations for the controller 1000. In one implementation, the input/output devices 1060 includes a keyboard and/or pointing device. In another implementation, the input/output devices 1060 includes a display unit for displaying graphical user interfaces.

There can be any number of controllers 1000 associated with, or external to, a computer system containing controller 1000, with each controller 1000 communicating over a network. Further, the terms "client," "user," and other appropriate terminology can be used interchangeably, as appropriate, without departing from the scope of the present disclosure. Moreover, the present disclosure contemplates that many users can use one controller 1000 and one user can use multiple controllers 1000.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for determining fracture roughness from a drill core, the method comprising:
scanning, using at least one hardware processor, a drill core to obtain core images;
identifying, using the at least one hardware processor, natural fractures in the core images, wherein the identification of natural fractures is done using sequential filtering that comprises:
excluding from further processing core images that show fractures formed by damage to the drill core;
excluding from further processing core images that show bed splitting;
excluding from further processing core images that show disking;
excluding from further processing core images that show vertical fractures with planes parallel to a direction of maximum horizontal stress when the core is obtained from a vertical borehole; and
excluding from further processing veins and other fractures of partial intersections;
digitizing, using the at least one hardware processor, the identified natural fractures in the core images to obtain a pair of ellipses corresponding to a top wall and a base wall of the identified natural fractures;
unrolling, using the at least one hardware processor, the pair of ellipses into a fracture profile comprising a pair of sinusoids corresponding to the top wall and the base wall of the identified natural fractures;
determining, using the at least one hardware processor, a best fitting sinusoid of the fracture profile, wherein at least one statistical estimator is calculated using a difference between the best fitting sinusoid and the fracture profile; and
converting, using the at least one hardware processor, the calculated statistical estimators to a joint roughness coefficient.

2. The computer implemented method of claim 1, wherein excluding from further processing core images that show bed splitting is performed using a predetermined threshold to filter core splits along bed planes.

3. The computer implemented method of claim 1, comprising excluding drill cores from scanning that do not satisfy a predetermined geometry.

4. The computer implemented method of claim 1, comprising excluding damaged drill cores from scanning.

5. The computer implemented method of claim 1, wherein digitizing the identified natural fractures in the core images to obtain a pair of ellipses comprises tracing the identified natural fractures.

6. The computer implemented method of claim 1, wherein the best fitting position of the sinusoid minimizes the joint roughness coefficient.

7. The computer implemented method of claim 1, comprising calculating mismatches of the top wall and the base wall of a respective natural fracture using a correlation coefficient or a standard deviation of apertures between the top wall and the base wall.

8. An apparatus comprising a non-transitory, computer readable, storage medium that stores instructions that, when executed by at least one processor, cause the at least one processor to perform operations comprising:
scanning a drill core to obtain core images;
identifying natural fractures in the core images, wherein the identification of natural fractures is done using sequential filtering that comprises:
excluding from further processing core images that show fractures formed by damage to the drill core;
excluding from further processing core images that show bed splitting;
excluding from further processing core images that show disking;
excluding from further processing core images that show vertical fractures with planes parallel to a direction of maximum horizontal stress when the core is obtained from a vertical borehole; and
excluding from further processing veins and other fractures of partial intersections;
digitizing the identified natural fractures in the core images to obtain a pair of ellipses corresponding to a top wall and a base wall of the identified natural fractures;
unrolling the pair of ellipses into a fracture profile comprising a pair of sinusoids corresponding to the top wall and the base wall of the identified natural fractures;
determining a best fitting sinusoid of the fracture profile, wherein at least one statistical estimator is calculated using a difference between the best fitting sinusoid and the fracture profile; and
converting the calculated statistical estimators to a joint roughness coefficient.

9. The apparatus of claim 8, wherein excluding from further processing core images that show bed splitting is performed using a predetermined threshold to filter core splits along bed planes.

10. The apparatus of claim 8, comprising excluding drill cores from scanning that do not satisfy a predetermined geometry.

11. The apparatus of claim 8, comprising excluding damaged drill cores from scanning.

12. The apparatus of claim 8, wherein digitizing the identified natural fractures in the core images to obtain a pair of ellipses comprises tracing the identified natural fractures.

13. The apparatus of claim 8, wherein the best fitting position of the sinusoid minimizes the joint roughness coefficient.

14. The apparatus of claim 8, comprising calculating mismatches of the top wall and the base wall of a respective natural fracture using a correlation coefficient or a standard deviation of apertures between the top wall and the base wall.

15. A system, comprising:

one or more memory modules;

one or more hardware processors communicably coupled to the one or more memory modules, the one or more hardware processors configured to execute instructions stored on the one or more memory models to perform operations comprising:

scanning a drill core to obtain core images;

identifying natural fractures in the core images, wherein the identification of natural fractures is done using sequential filtering that comprises:

excluding from further processing core images that show fractures formed by damage to the drill core;

excluding from further processing core images that show bed splitting;

excluding from further processing core images that show disking;

excluding from further processing core images that show vertical fractures with planes parallel to a direction of maximum horizontal stress when the core is obtained from a vertical borehole; and excluding from further processing veins and other fractures of partial intersections;

digitizing the identified natural fractures in the core images to obtain a pair of ellipses corresponding to a top wall and a base wall of the identified natural fractures;

unrolling the pair of ellipses into a fracture profile comprising a pair of sinusoids corresponding to the top wall and the base wall of the identified natural fractures;

determining a best fitting sinusoid of the fracture profile, wherein at least one statistical estimator is calculated using a difference between the best fitting sinusoid and the fracture profile; and converting the calculated statistical estimators to a joint roughness coefficient.

16. The system of claim 15, wherein excluding from further processing core images that show bed splitting is performed using a predetermined threshold to filter core splits along bed planes.

17. The system of claim 15, comprising excluding drill cores from scanning that do not satisfy a predetermined geometry.

18. The system of claim 15, comprising excluding damaged drill cores from scanning.

19. The system of claim 15, wherein digitizing the identified natural fractures in the core images to obtain a pair of ellipses comprises tracing the identified natural fractures.

20. The system of claim 15, wherein the best fitting position of the sinusoid minimizes the joint roughness coefficient.

* * * * *